US012483631B2

(12) United States Patent
Vardhe et al.

(10) Patent No.: US 12,483,631 B2
(45) Date of Patent: Nov. 25, 2025

(54) SYSTEMS AND METHODS FOR PROVIDING A FILTERED DISCOVERY SERVICE

(71) Applicant: Nile Global, Inc., San Jose, CA (US)

(72) Inventors: Dipen Vardhe, San Jose, CA (US); Suresh Katukam, Milpitas, CA (US)

(73) Assignee: Nile Global, Inc., San Jose, CA (US)

( * ) Notice: Subject to any disclaimer, the term of this patent is extended or adjusted under 35 U.S.C. 154(b) by 83 days.

(21) Appl. No.: 18/638,580

(22) Filed: Apr. 17, 2024

(65) Prior Publication Data
US 2025/0330526 A1 Oct. 23, 2025

(51) Int. Cl.
*H04L 67/51* (2022.01)
(52) U.S. Cl.
CPC .................. *H04L 67/51* (2022.05)
(58) Field of Classification Search
CPC ....................................... H04L 67/51
See application file for complete search history.

(56) References Cited

U.S. PATENT DOCUMENTS

| 8,972,589 | B2 | 3/2015 | Roese et al. |
| 2016/0142496 | A1* | 5/2016 | Wang ............... H04L 67/56 709/217 |
| 2016/0150029 | A1 | 5/2016 | Atreya et al. |
| 2021/0288878 | A1 | 9/2021 | Smith et al. |
| 2023/0162271 | A1* | 5/2023 | Ahmed .............. G06Q 30/0631 705/26.7 |

OTHER PUBLICATIONS

Chesire, S. et al. "Multicast DNS", Internet Engineering Task Force (IETF), Request for Comments: 6762, Feb. 2013, 70 pgs.
Chesire, S. et al. "DNS-Based Service Discovery", Internet Engineering Task Force (IETF), Request for Comments: 6763, Feb. 2013, 49 pgs.

* cited by examiner

*Primary Examiner* — Benjamin M Thieu
(74) *Attorney, Agent, or Firm* — LOZA & LOZA LLP

(57) ABSTRACT

Databases may include records that: associate service providers with location indicators and with service types. A proximity rule may be associated with one of the service types. A discovery request may include location metadata and a service identifier associated with the service type associated with the proximity rule. In response to receiving the discovery request, the proximity rule may be applied to the location metadata and the location indicators to identify a service provider that satisfies the proximity rule and that provides the service indicated by the service identifier. A discovery response that is responsive to the discovery request and that indicates the service provider may be sent in response to the discovery request.

20 Claims, 11 Drawing Sheets

SYSTEMS AND METHODS FOR PROVIDING A FILTERED DISCOVERY SERVICE

TECHNICAL FIELD

The systems and methods relate to discovering networked devices that provide services such as playing audio, showing video, printing, etc. The systems and methods also relate to filtering the discovered service providers by proximity and the type of service provided.

BACKGROUND

Users can connect user devices, such as smartphones, to nearby service providers that provide services such as playing audio, showing video, printing documents, etc. For example, a large screen television can be a service provider on which the user device shows video. The internet engineering task force (IETF) published IETF request for comment (RFC) 6763 that specifies how domain name system (DNS) resource records may be named and structured to facilitate service discovery (SD). The mechanism specified in IETF RFC 6763 may be referred to as DNS based SD or DNS-SD. A user device may use multicast DNS (mDNS), specified by IETF RFC 6762, to query DNS name servers and thereby discover service providers. For example, a smartphone may transmit an mDNS request that is answered by a mDNS response transmitted by a DNS name server. The mDNS response can include a list of service providers. Mechanisms other than mDNS and DNS-SD may alternatively provide a list of service providers to the user device. The provided list may be large and may include service providers that are less relevant than others. Mechanisms for filtering the list of service providers are therefore needed.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented by a method. The method may include associating a plurality of service providers with a plurality of location indicators and a plurality of service types, associating a proximity rule with one of the service types, receiving a discovery request that includes location metadata and a service identifier associated with the one of the service types, applying the proximity rule to the location metadata and the location indicators to identify a one of the service providers that satisfies the proximity rule and that provides a service indicated by the service identifier, and sending a discovery response that is responsive to the discovery request and that indicates the one of the service providers.

Another aspect of the subject matter described in this disclosure can be implemented by a system. The system may include a memory configured to store a services metadata and a proximity metadata, the services metadata associating a plurality of location indicators with a plurality of service providers and a plurality of service types, and the proximity metadata associating a proximity rule with one of the service types, and a processor coupled to the memory, wherein the processor and the memory are configured to provide a filtered discovery service. Providing the filtered discovery service may include receiving a discovery request that includes location metadata and a service identifier associated with the one of the service types, applying the proximity rule to the location metadata and to the location indicators to identify a one of the service providers that satisfies the proximity rule and that provides a service indicated by the service identifier, and sending a discovery response that is responsive to the discovery request and that indicates the one of the service providers.

Yet another aspect of the subject matter described in this disclosure can be implemented by a system. The system may include an association means for associating a plurality of service providers with a plurality of location indicators and a plurality of service types, a rule association means for associating a proximity rule with one of the service types, a receiver means for receiving a discovery request that includes location metadata and a service identifier associated with the one of the service types, an identification means for applying the proximity rule to the location metadata and the location indicators to identify a service provider that satisfies the proximity rule and that provides a service indicated by the service identifier, and a transmission means for sending a discovery response that is responsive to the discovery request and that indicates the service provider.

In some implementations of the methods and devices, the method may further include associating a plurality of service identifiers with the one of the service types. In some implementations of the methods and devices, the one of the service types is associated with a plurality of audio services. In some implementations of the methods and devices, the one of the service types is associated with a plurality of media sharing services. In some implementations of the methods and devices, the one of the service types is associated with a plurality of screen casting services. In some implementations of the methods and devices, the one of the service types is associated with a plurality of printing services. In some implementations of the methods and devices, the method may further include associating the one of the service providers with a location indicator for the one of the service providers in response to receiving service metadata from an access device, wherein the service metadata includes the service identifier, a service provider identifier of the one of the service providers, and the location indicator for the one of the service providers. In some implementations of the methods and devices, the method may further include sending the service metadata to a discovery orchestrator in response to receiving a service announcement from the service provider. In some implementations of the methods and devices, a wireless access point sends the service metadata to a discovery orchestrator in response to receiving a service announcement from the service provider. In some implementations of the methods and devices, the proximity rule requires a maximum hop count between the location metadata and a location indicator associated with the one of the service providers. In some implementations of the methods and devices, the proximity rule requires the location metadata to indicate a room indicated by a location indicator associated with the one of the service providers.

In some implementations of the methods and devices, providing the filtered discovery service includes associating a service provider with a location indicator in response to receiving service metadata from an access device. In some implementations of the methods and devices, the system may further include a wireless access point configured to send the service metadata to a discovery orchestrator in response to receiving a service announcement from the service provider. In some implementations of the methods and devices, providing the filtered discovery service includes associating a plurality of service identifiers with the one of the service types. In some implementations of the methods and devices, the proximity rule requires a maximum hop count between the location metadata and a location indicator associated with the service provider. In some implementations of the methods and devices, the proximity rule requires the location metadata to indicate a room indicated by a location indicator associated with the service provider. In some implementations of the methods and devices, the one of the service types is associated with a plurality of screen casting services.

In some implementations of the methods and devices, the system may further include a means for associating a service provider with a location indicator for the one of the service providers in response to receiving service metadata from an access device, wherein the service metadata includes the service identifier, a service provider identifier of the one of the service providers, and the location indicator for the one of the service providers.

BRIEF DESCRIPTION OF THE DRAWINGS

Throughout the description, similar reference numbers may be used to identify similar elements.

DETAILED DESCRIPTION

Figure 1:
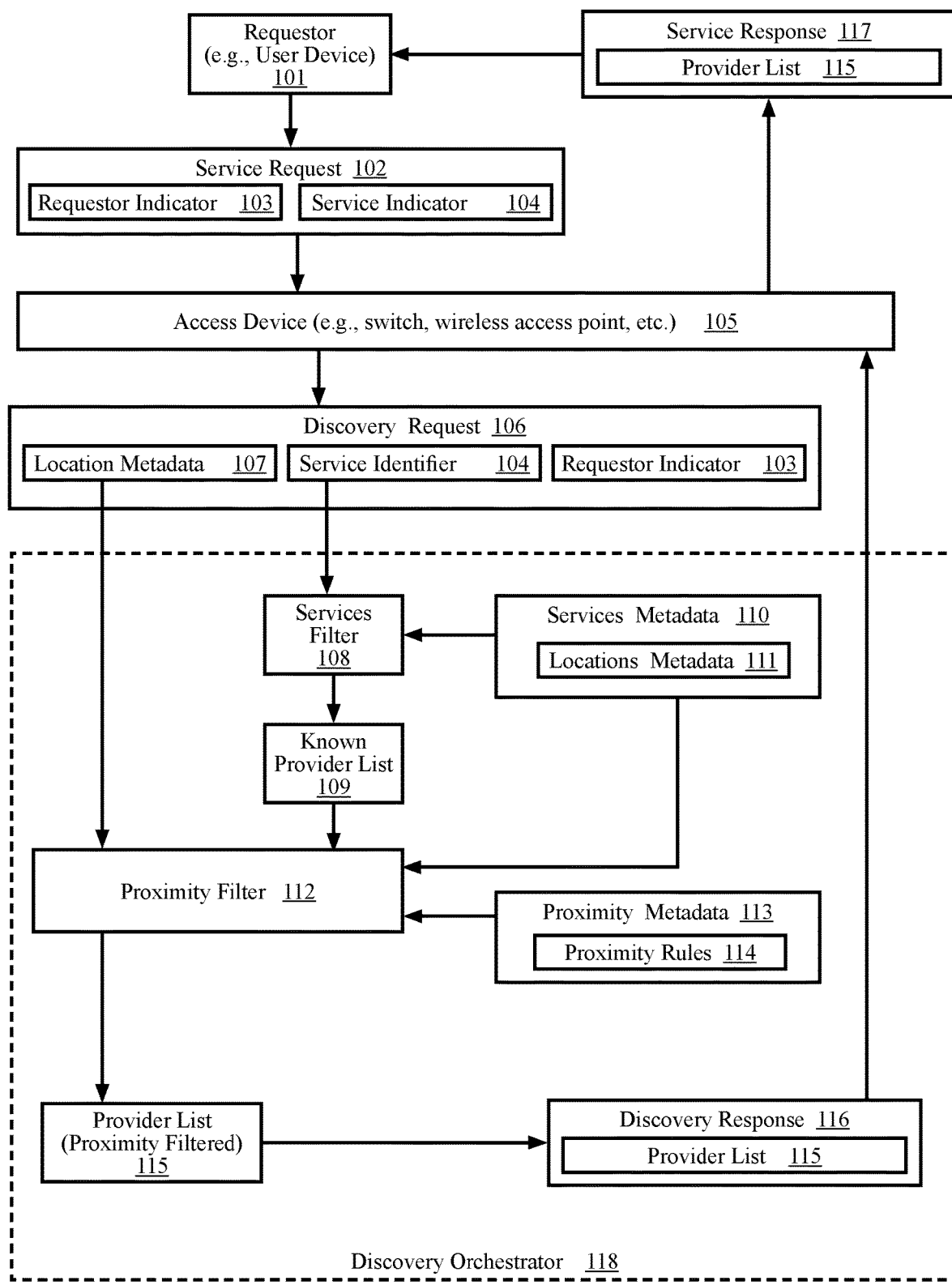
FIG. 1 is a high-level block diagram illustrating an example of a discovery orchestrator that can provide a filtered discovery service, according to some aspects.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

The described examples are to be considered in all respects only as illustrative and not restrictive. The scope of the claimed matter is therefore indicated by the appended claims rather than by this detailed description. All changes which come within the meaning and range of equivalency of the claims are to be embraced within their scope.

Reference throughout this specification to features, advantages, or similar language does not imply that all the features and advantages that may be realized should be realized in any single example. Rather, language referring to the features and advantages is understood to mean that a specific feature, advantage, or characteristic described in connection with an example is included in at least one implementation. Thus, discussions of the features and advantages, and similar language, throughout this specification may, but do not necessarily, refer to the same example.

Furthermore, the described features, advantages, characteristics, and aspects may be combined in any suitable manner in one or more examples. One skilled in the relevant art will recognize from the description herein that one example may be practiced without one or more of the specific features or advantages of another example. In other instances, additional features and advantages may be recognized in certain examples that may not be present in all examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

Users often use their user devices (e.g., smartphone, laptop computer, person computer, tablet device, smart watch, etc.) to play music on the speaker of an audio service provider, show video on the screen of a video service provider, print a document on a printing service provider, and to otherwise use the service of service providers. For example, a user may want to use a smartphone to play music on an audio system or to use a laptop computer to show images or video on a large display in a conference room. The user device may need to discover the service providers for the desired service before connecting to and using one of the service providers. As such, the user device may send a discovery request on a computer network and receive a discovery response that includes a list of available providers. One issue is that there may be many providers of a specific service. For example, an iPhone user wanting to play music may be presented with a list of all the network connected speakers in a large building. Most of those listed speakers may be irrelevant because they are too far away to be useful.

As such, service providers may be filtered such that only nearby service providers are listed. An issue with such location filtering is that different types of services are useful at different distances. For example, a print server on the far side of a building may be used for printing a document, but a speaker on the far side of the building may be a poor choice for playing music or other audio.

Many of the issues with location filtering and service filtering may be addressed via service type based proximity filtering. Each of the provided services may be associated with a service type. For example, AirPlay (a trademark of Apple, Inc) and Spotify Connect (a trademark of Spotify, AB) may be associated with the "audio" service type. Similarly, the services provided by a print server may be associated with the "printing" service type. Each service type may be associated with a proximity rule. For example, "printing" may be associated with a proximity rule that requires the user device and the service provider to be in the same building while "audio" may be associated with a proximity rule that requires the user device and the service provider to be in the same room. In this manner, the user is provided with a list of service providers that are relevant with respect to the type of service desired.

FIG. 1 is a high-level block diagram illustrating an example of a discovery orchestrator 118 that can provide a filtered discovery service, according to some aspects. A requestor 101, such as a smartphone or other user device, can send a service request 102 to an access device 105 such as a wireless access point (e.g., WIFI router) or a wired access point (e.g., Ethernet switch or Ethernet router). The service request 102 may include a requestor indicator 103 and a service identifier 104. The requestor indicator 103 may be a value that identifies the requestor 101 such as the internet protocol (IP) address or the media access control (MAC) address of the requestor 101. The service identifier 104 may indicate the specific service that is being requested. The access device 105 may produce a discovery request 106 in response to receiving the service request 102. The discovery request 106 may include the requestor indicator 103, service identifier 104, and location metadata 107. The location metadata may be one or more values or strings that may indicate the location of the access device 105 or of the requestor 101. For example, the location metadata may be the IP address or the MAC address of the access device 105. Facilities such as office buildings may record the locations, MAC addresses, and IP addresses of installed network equipment in a database. As such, the location metadata may be used to determine the physical location of the access device 105. In some scenarios, the access device may store location information for its own location and may include that location information in the location metadata. Some access devices may determine the direction of a user device (e.g., 5G remote radio heads may employ beam steering antennas) or may even determine the physical location of a user device (e.g., a 5G radio access network may triangulate user device locations).

A discovery orchestrator 118 may produce a discovery response 116 in response to receiving the discovery request 106. The discovery orchestrator 118 may store or otherwise access (e.g., via network attached storage, a storage area network, etc.) services metadata 110 and proximity metadata. The services metadata 110 may include records that indicate the services provided by the service providers and may include locations metadata 111 indicating the locations of the service providers. Furthermore, the locations metadata 111 may include data that indicates the locations of the access devices. The proximity metadata 113 may include records that store proximity rules 114 and may associate specific proximity rules with specific service types.

The discovery orchestrator 118 may include a services filter 108 and a proximity filter 112. The service filter 108 may produce a known providers list 109 listing providers that provide the service indicated by the service identifier 104. For example, the services filter may search the services metadata 110 for providers that provide the service indicated by the service identifier 104 to thereby produce the known provider list 109. The proximity filter 112 may produce a provider list 115 by applying a proximity rule to the known providers in the known provider list 109. For example, the service type (e.g., "audio", "video", etc.) of the service indicated by the service identifier 104 may be associated with one of the proximity rules 114. The proximity filter 112 may access the locations metadata to obtain the location information for the access device 105 and for the service providers and may apply the proximity rule to that location information to determine which of the service providers that are included in the known provider list 109 also satisfy the proximity rule. For example, the proximity rule may be "requestor room equals service provider room" such that the proximity rule is satisfied only by the service providers in the same room as the requestor 101. Many scenarios may use the access device location as a proxy for the requestor location such that the proximity rule "requestor room equals service provider room" becomes "access device room equals service provider room". The provider list 115 may be a list of service providers that provide the desired service and satisfy the proximity rule. A discovery response 116 that includes the provider list 115 may be sent by the discovery orchestrator 118 to the access device 105. The access device 105 may then send a service response 117 that includes the provider list 115 to the requestor 101. At this point, the user may select a service provider from the service provider list 115 or the requestor may automatically select one of the listed service providers. The requestor may then communicate with the selected service provider.

Figure 2:
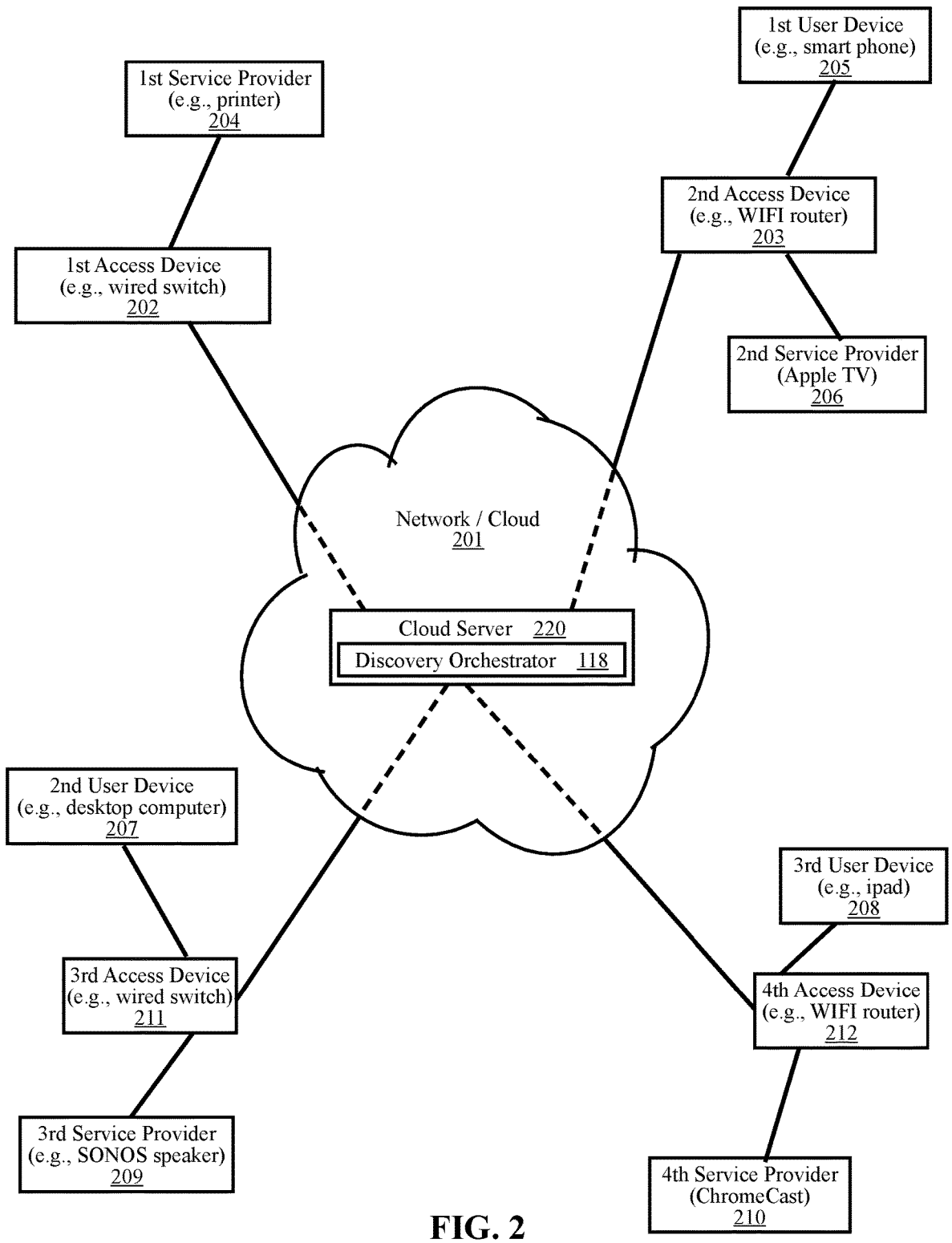
FIG. 2 is a high-level diagram illustrating an example of a networked environment that includes a discovery orchestrator that can provide a filtered discovery service, according to some aspects.

FIG. 2 is a high-level diagram illustrating an example of a networked environment that includes a discovery orchestrator 118 that can provide a filtered discovery service, according to some aspects. In an example, the discovery orchestrator 118 may be provided as a cloud based software-as-a-service (SaaS) offering. An example of SaaS is software that runs on a cloud server 220 and that is accessed online via a subscription. The cloud server 220 may be a server running in a data center. In contrast, an example of software that is not SaaS may be software that is bought and installed on individual computers running within a local network. As such, the filtered discovery service may be a cloud based service (e.g. SaaS) in which the discovery orchestrator 118 may run on a cloud server 220 in a data center thousands of miles from the requestor and the service providers. Alternatively, the discovery service may be installed and run within the same facility as the user devices and service providers. The services metadata 110 and the proximity metadata 113 may be stored in databases implemented in that data center. The example illustrated in FIG. 2 includes a discovery orchestrator 118 running on a cloud server 220 in a data center as SaaS. As such, the discovery orchestrator 118 and the cloud server 220 are illustrated within the cloud 201. The "cloud" may be the Internet and may thereby include the data center. A first access device 202 (e.g., a wired layer two or layer three switch) may be connected to the cloud 201, a private network within a facility, etc. A first service provider 204 (e.g., a printer) may be connected to the first access device 202. A first user device 205 (e.g., a smartphone) and a second service provider 206 (e.g., a display configured with Apple TV) may be connected to a second access device 203 (e.g., a WIFI router) that may be connected to the cloud 201, a private network within a facility, etc. A second user device 207 (e.g., a laptop computer) and a third service provider 209 (e.g., a SONOS speaker) may be connected to the network/cloud 201 by a third access device 211. A third user device 208 (e.g., an iPad) and a fourth service provider 210 (e.g., a ChromeCast) may be connected to the network/cloud 201 by a fourth access device 212. The first access device 202, the second access device 203, the third access device 211, and the fourth access device 212 may be connected to the discovery orchestrator 118 via the cloud 201.

The network illustrated in FIG. 2 may be an example of a Network as a Service (NaaS) implementation. NaaS is a cloud-based model that allows customers to outsource their network infrastructure and management to a NaaS provider who may deliver networking services such as connectivity, security, and optimization, over the internet. As such, the NaaS provider may remotely manage the network infrastructure devices (e.g., first access device 202, second access device 203, third access device 211, fourth access device 212, etc.) that are in the customer's facility. In an example, the NaaS provider uses SaaS applications (e.g., application programs running in a data center) to manage those network infrastructure devices. As such, the discovery orchestrator 118 may be one of many SaaS applications that the NaaS provider uses for managing the customer's network and for providing services to the customer. The networking devices may be custom devices supplied by the NaaS provider or may be third party devices known to be compatible with the SaaS applications or with other network management software used by the NaaS provider. In some scenarios, the NaaS provider may run SaaS applications or components of SaaS application in the customer's facility. In an example, the networking devices in the customer's facility includes devices that may host the SaaS applications or components of the SaaS applications. NaaS may enable customers to scale their network resources on-demand, reduce capital expenditure on hardware and software, and focus on their core competencies, while the NaaS provider ensures the performance, reliability, and security of the network.

Figure 3:
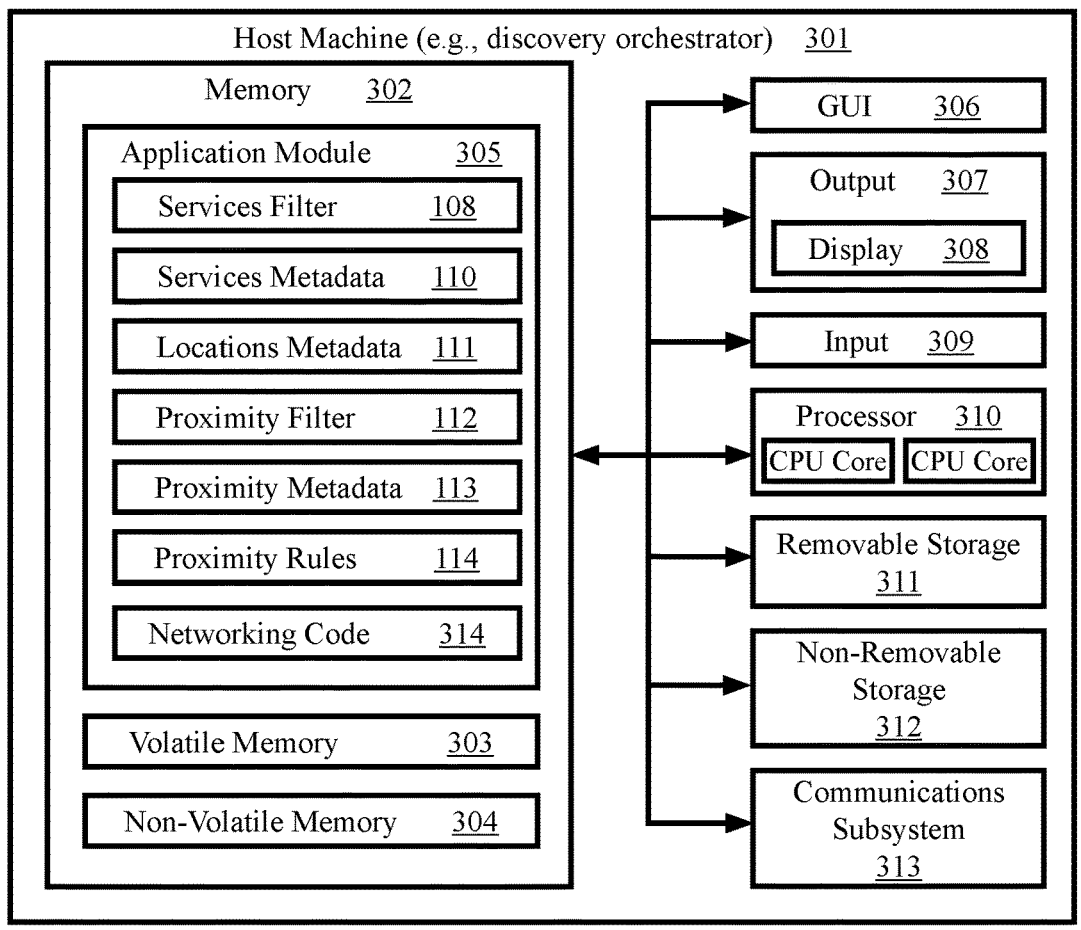
FIG. 3 is a high-level block diagram illustrating an example of a host machine that may implement a discovery orchestrator, according to some aspects.

FIG. 3 is a high-level block diagram illustrating an example of a host machine 301 that may implement a discovery orchestrator 118, according to some aspects. A computing device in the form of a host machine 301 configured to interface with controllers, peripheral devices, and other elements disclosed herein, may include one or more processing units 310 coupled to memory 302, removable storage 311, and non-removable storage 312. Memory 302 may include volatile memory 303 and non-volatile memory 304. Host machine 301 may include or have access to a computing environment that includes a variety of transitory and non-transitory computer-readable media such as volatile memory 303 and non-volatile memory 304, removable storage 311 and non-removable storage 312. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data. Of the listed computer storage, volatile memory, and most RAM, such as dynamic RAM (DRAM), are transitory while the others are considered non-transitory.

Host machine 301 may include, or have access to, a computing environment that includes input 309, output 307, and a communications subsystem 313. The host machine 301 may operate in a networked environment using a communications subsystem 313 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, radio frequency identification (RFID) enabled device, a peer device or other common network node, or the like. The communication connection may include a local area network (LAN), a wide area network (WAN), Bluetooth connection, or other networks.

Output 307 may be provided as a computer monitor or flat panel display but may include any output device. Output 307 and/or input 309 may include a data collection apparatus associated with host machine 301. In addition, input 309, which commonly includes a computer keyboard and/or pointing device such as a computer mouse, computer trackpad, touch screen, or the like, allows a user to select and instruct host machine 301. A user interface can be provided using output 307 and input 309. Output 307 may include a display 308 for displaying data and information for a user, or for interactively displaying a graphical user interface (GUI) 306. A GUI is typically responsive to user inputs entered through input 309 and typically displays images and data on display 308.

Note that the term "GUI" generally refers to a type of environment that represents programs, files, options, and so forth by means of graphically displayed icons, menus, and dialog boxes on a computer monitor screen or smartphone screen. A user can interact with the GUI to select and activate such options by directly touching the screen and/or pointing and clicking with a user input device 309 such as, for example, a pointing device such as a mouse, and/or with a keyboard. A particular item can function in the same manner to the user in all applications because the GUI provides standard software routines (e.g., the application module 305 can include program code in executable instructions, including such software routines) to handle these elements and report the user's actions.

Computer-readable instructions, for example, program code in application module 305, can include or be representative of software routines, software subroutines, software objects, etc. described herein, are stored on a computer-readable medium and are executable by the processor device (also called a processing unit) 310 of host machine 301. The application module 305 may include computer code such as a services filter 108, a proximity filter 112, and networking code 314. The computer code may read, write, or modify data such as services metadata 110, locations metadata 111, proximity metadata 113, and proximity rules 114. The application module 305 may include the services metadata 110, locations metadata 111, proximity metadata 113, and proximity rules 114. A hard drive, CD-ROM, RAM, flash memory, and a USB drive are just some examples of articles including a computer-readable medium.

Figure 4:
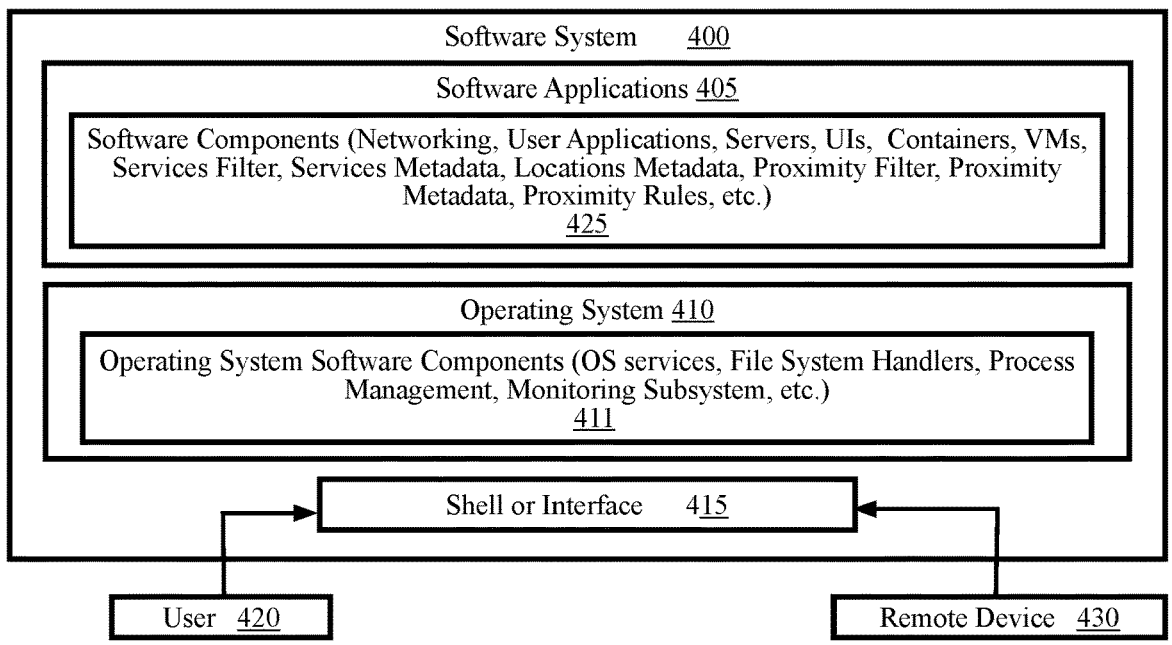
FIG. 4 is a high-level block diagram illustrating an example of a software system according to some aspects.

FIG. 4 is a high-level block diagram illustrating an example of a software system 400, according to some aspects. The software system 400 may be employed for directing the operation of data-processing systems such as host machine 301. Software applications 405, may be stored in memory 302, on removable storage 311 or on non-removable storage 312, and generally includes and/or is associated with an operating system 410 and a shell or interface 415. One or more application programs may be "loaded" (i.e., transferred from removable storage 311 or non-removable storage 312 into the memory 302) for execution by the host machine 301. Application programs 405 can include software components 425 such as software modules, software subroutines, software objects, network code, user application code, server code, UI code, container code, virtual machine (VM) code, services filter code, services metadata, locations metadata, proximity filter code, proximity metadata, proximity rules, etc. The software system 400 can have multiple software applications each containing software components. The host machine 301 can receive user commands and data through interface 415, which can include input 309, output 307, and communications connection 313 accessible by a user 420 or remote device 430. These inputs may then be acted upon by the host machine 301 in accordance with instructions from operating system 410 and/or software applications 405 and any software components 425 thereof. The operating system may include operating system software components 411 such as operating system services, file system handlers, process management, monitoring subsystem, etc.

Generally, software components 425 can include, but are not limited to, routines, subroutines, software applications, programs, modules, objects (used in object-oriented programs), executable instructions, data structures, etc., that perform specific tasks or implement specific abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, etc.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that implements the routines in the application or component. The terms application or component may also simply refer to an application such as a computer program designed to assist in the performance of a specific task such as word processing, accounting, etc. Components can be built or realized as special purpose hardware components designed to equivalently assist in the performance of a task.

The interface 415 can include a graphical user interface 306 that can display results, whereupon a user 420 or remote device 430 may supply additional inputs or terminate a particular session. In some examples, operating system 410 and GUI 306 can be implemented in the context of a "windows" system. It can be appreciated, of course, that other types of systems are possible. For example, rather than a traditional "windows" system, other operating systems such as, for example, a real time operating system (RTOS) more commonly employed in wireless systems may also be employed with respect to operating system 410 and interface 415. The software application 405 can include, for example, software components 425 that may include instructions for carrying out steps or logical operations such as those shown and described herein.

The description herein is presented with respect to examples that may be implemented in the context of, or require the use of, a data processing system such as host machine 301, in conjunction with program code in an application module 305 in memory 302, software system 400, or host machine 301. The disclosed examples, however, are not limited to any specific application or environment. Instead, those skilled in the art will find that the systems and methods described herein may be advantageously applied to a variety of system and application software including database management systems, word processors, etc. Moreover, the examples may be implemented on a variety of different platforms including Windows, Macintosh, UNIX, LINUX, Android, Arduino, etc. Therefore, the descriptions of the examples which follow are for purposes of illustration and not considered a limitation.

Host machines 301 and software systems 400 can take the form of or run as virtual machines (VMs) or containers that run on physical machines. A VM or container typically supplies an operating environment, appearing to be an operating system, to program code in an application module and software applications 405 running in the VM or container. A single physical computer can run a collection of VMs and containers. In fact, an entire network data processing system including a multitude of host machines 301, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 5:
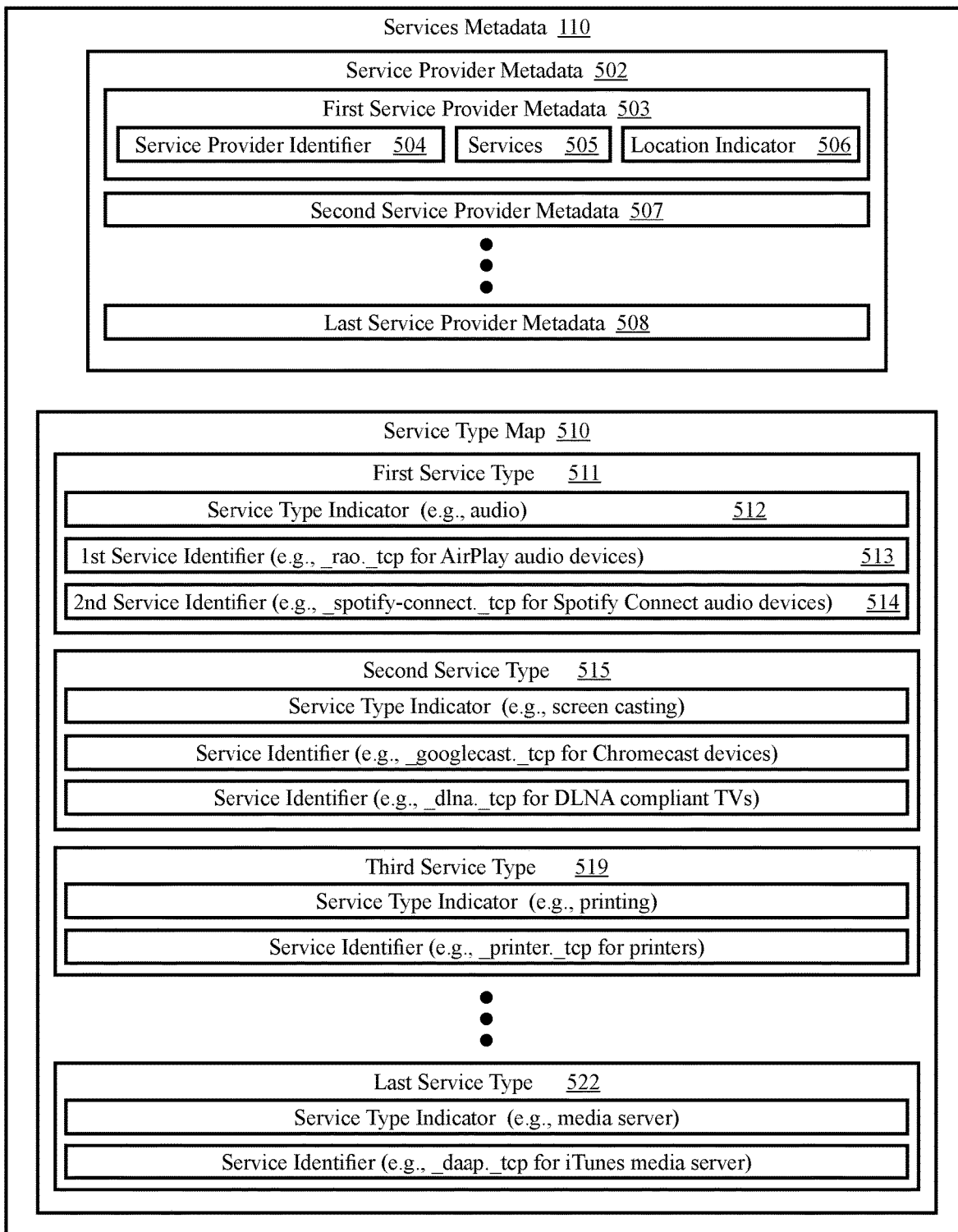
FIG. 5 is a high-level conceptual diagram illustrating an example of services metadata, according to some aspects.

FIG. 5 is a high-level conceptual diagram illustrating an example of services metadata 110, according to some aspects. The services metadata 110 may include service provider metadata 502 and a service type map 510. The service provider metadata may include entries or records such as first service provider metadata 503 (e.g., an audio device providing audio services), second service provider metadata 507 (e.g., a display device providing image and video display services), and last service provider metadata 508 (e.g., a printer providing printing services). The first service provider metadata can include a service provider identifier 504, an indication of services 505, and a location indicator 506. The service provider identifier 504 may uniquely identify the first service provider. The indication of services 505 may be a list of service identifiers that identify the services provided by the first services provider. The location indicator 506 may indicate the location of the first service provider.

The service type map 510 may group specific services into service types by associating service identifiers with service type indicators. The service type map 510 may include records or entries for a first service type 511, a second service type 515, a third service type 519 and a last service type 522. The records or entries for the service types may each include a service type indicator and a list or group of service identifiers. The service type indicator may indicate a type of service (e.g., audio, screen casting, printing, media server, etc.). A service identifier may identify a specific service that may be provided by one or more service providers. For example, a first service type 511 record or entry may include a service type indicator 512 indicating "audio", a first service identifier 513 equaling "_rao._tcp", and a second service identifier 514 equaling "_spotify-connect._tcp". The service identifier "_rao._tcp" may be the service identifier for AirPlay audio devices accessible via transmission control protocol (TCP). The service identifier "_spotify-connect._tcp" may be the service identifier for Spotify Connect audio devices accessible via TCP. An "audio" service may be provided by a network connected speaker that provides audio services by playing music streamed from user devices. In a second example, a second service type 515 record or entry may include a "screen casting" service type indicator and the service identifiers "googlecast._tcp", and "_dlna._tcp". The service identifier "googlecast._tcp" may be the service identifier for Chromecast devices accessible via TCP. The service identifier "_dlna._tcp" may be the service identifier for DLNA compliant TVs accessible via TCP. A "screen casting" service may be provided by a network connected display device that provides screen casting services by showing images or video streamed from user devices. In a third example, a third service type 519 record or entry may include a "printing" service type indicator and the service identifier "_printer-._tcp". The service identifier "printer._tcp" may be the service identifier for a print server accessible via TCP. A "printing" service may be provided by a network connected printer that provides printing services by printing documents sent to the printer by user devices. In another example, a last service type 522 record or entry may include a "media server" service type indicator and the service identifier "_daap._tcp". The service identifier "_daap._tcp" may be the service identifier for iTunes media servers accessible via TCP. A media server may provide a media sharing service such that a requestor may access data (e.g., audio files, video files, etc.) stored by the media server. In an example, the media sharing service shares music to user devices.

Figure 6:
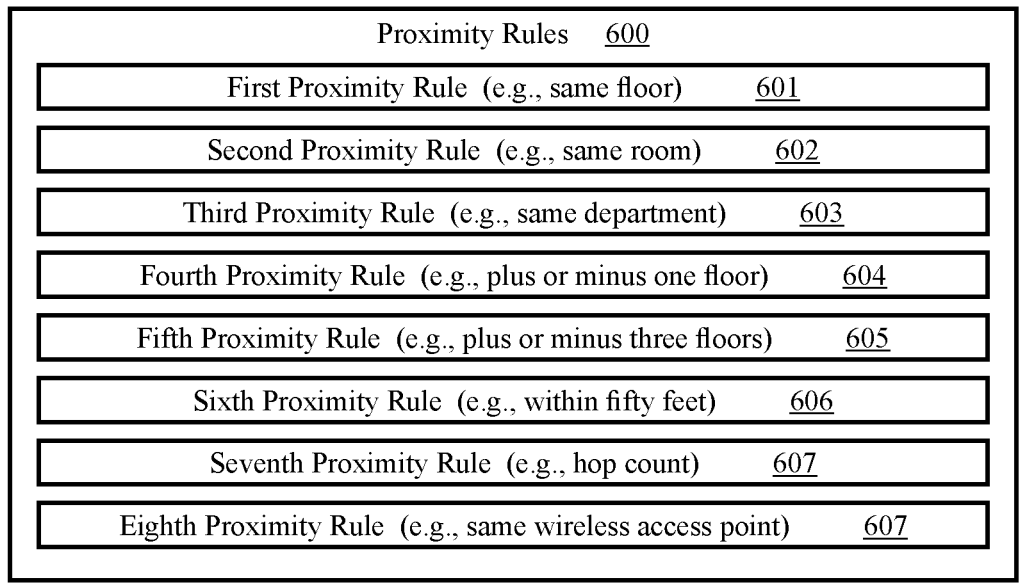
FIG. 6 is a high-level conceptual diagram illustrating an example of proximity rules, according to some aspects.

FIG. 6 is a high-level conceptual diagram illustrating an example of proximity rules 600, according to some aspects. The first proximity rule 601 may require the access device 105 and the service provider to be on the same floor of a building. The second proximity rule 602 may require the access device 105 and the service provider to be in the same room. The third proximity rule 603 may require the access device 105 and the service provider to be in the same department of an organization. The fourth proximity rule 604 may require the access device 105 and the service provider to be within one floor of one another (e.g., same floor, the floor above, or the floor below). The fifth proximity rule 605 may require the access device 105 and the service provider to be within three floors of one another. The sixth proximity rule 606 may require the access device 105 and the service provider to be within three floors of one another. The seventh proximity rule 607 may require the service provider to be connected to the access device 105 that received the service request.

Figure 7:
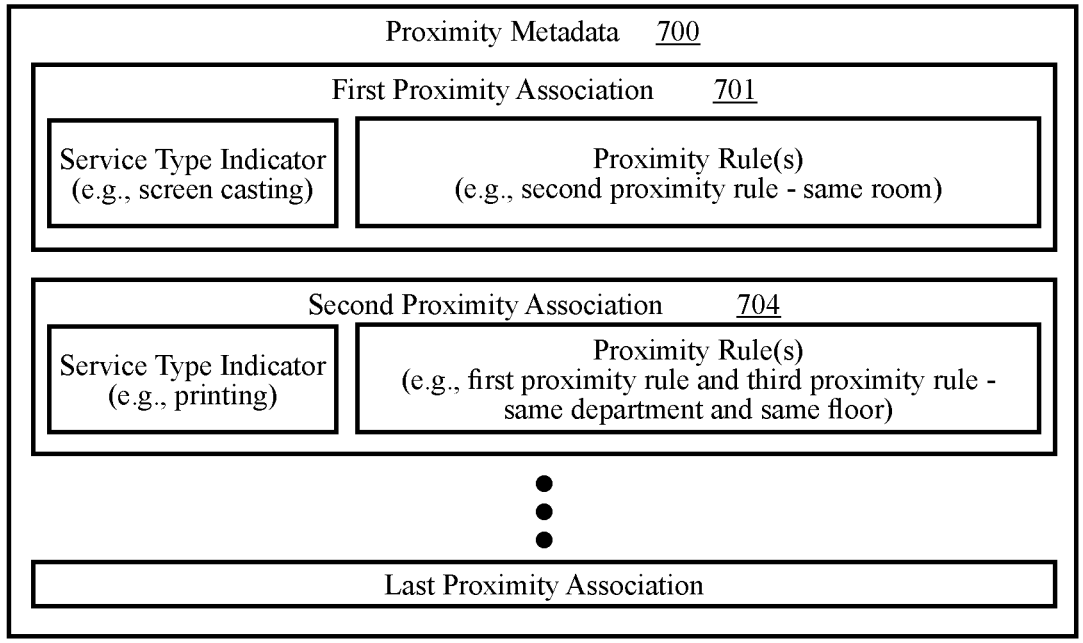
FIG. 7 is a high-level conceptual diagram of proximity metadata, according to some aspects.

FIG. 7 is a high-level conceptual diagram illustrating an example of proximity metadata 700, according to some aspects. The proximity metadata 700 may include a first proximity association 701, a second proximity association 704, and a last proximity association. The proximity associations may be records or entries that associate a service type indicator with one or more proximity rules. For example, the first proximity association 701 may associate the screen casting service type with the second proximity rule 602. Continuing the example, the second proximity association 704 may associate the printing service type with the first proximity rule 601 and with the third proximity rule 603 to indicate that the access device and the printer are required to be on the same floor or in the same department. Here, the result for the printing service type is the logical "or" of the results from applying two proximity rules. In other examples, the result for a service type may be the result of a different Boolean function or expression calculated from numerous proximity rule results.

Figure 8:
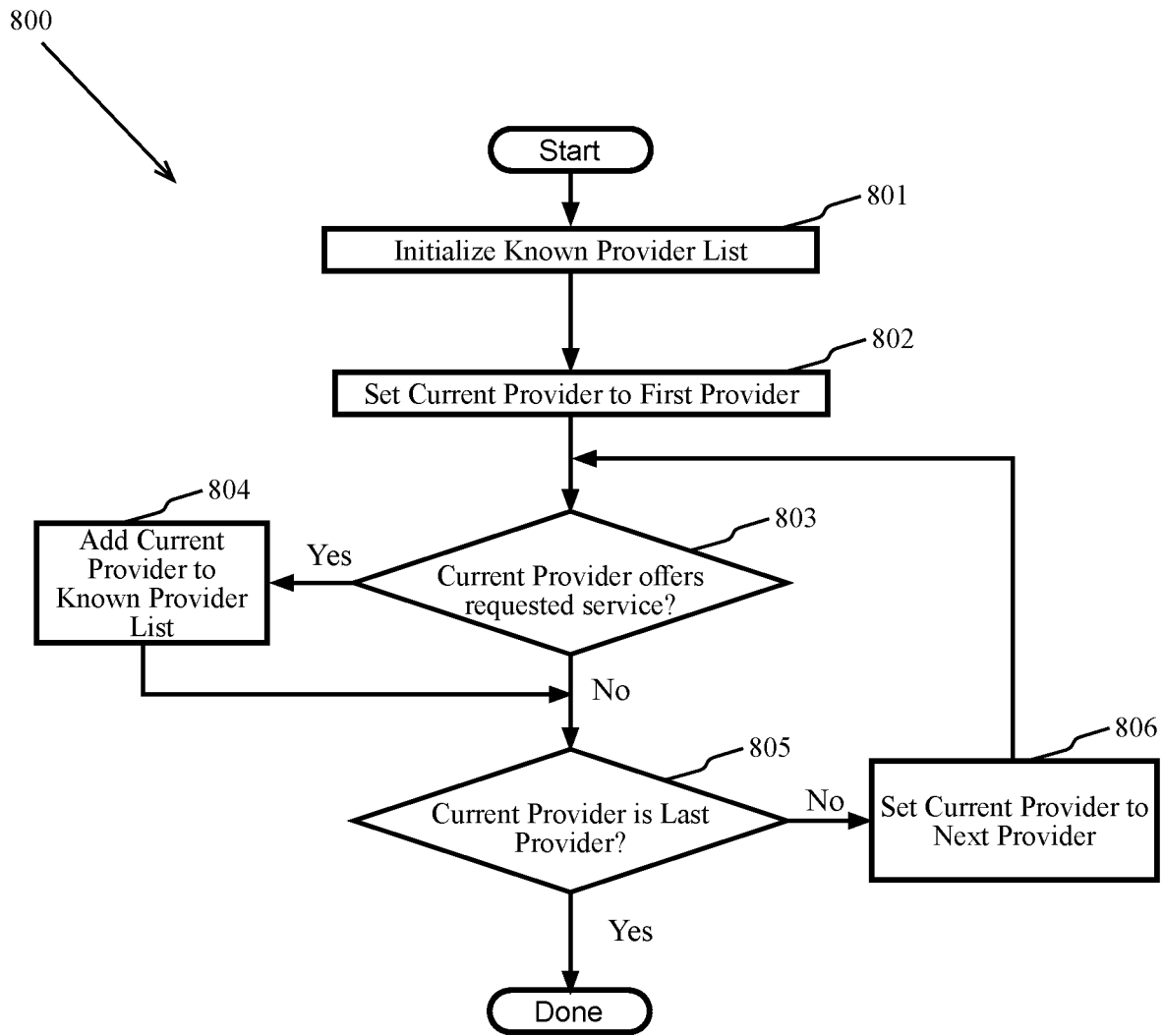
FIG. 8 a high-level flow diagram illustrating an example a process for producing a known provider list of service providers that offer a specified service, according to some aspects.

FIG. 8 a high-level flow diagram illustrating an example a process for producing a known provider list of service providers that offer a requested service 800, according to some aspects. After the start, a known provider list may be initialized at block 801 (e.g., an empty list instantiated). At block 802, current provider may be set to the first provider in a list of all service providers. The process may move to block 804 if it is determined that the current provider offers the requested service at decision block 803. Otherwise, the process may move to decision block 805. At block 804 the current provider may be added to the known provider list before the process moves to decision block 805. The process may be done if the current provider is the last provider in the list of all service providers at decision block 805. Otherwise, the process may move to block 806. At block 806, current provider may be set to the next provider in the list of all service providers before the process loops back to decision block 803.

Figure 9:
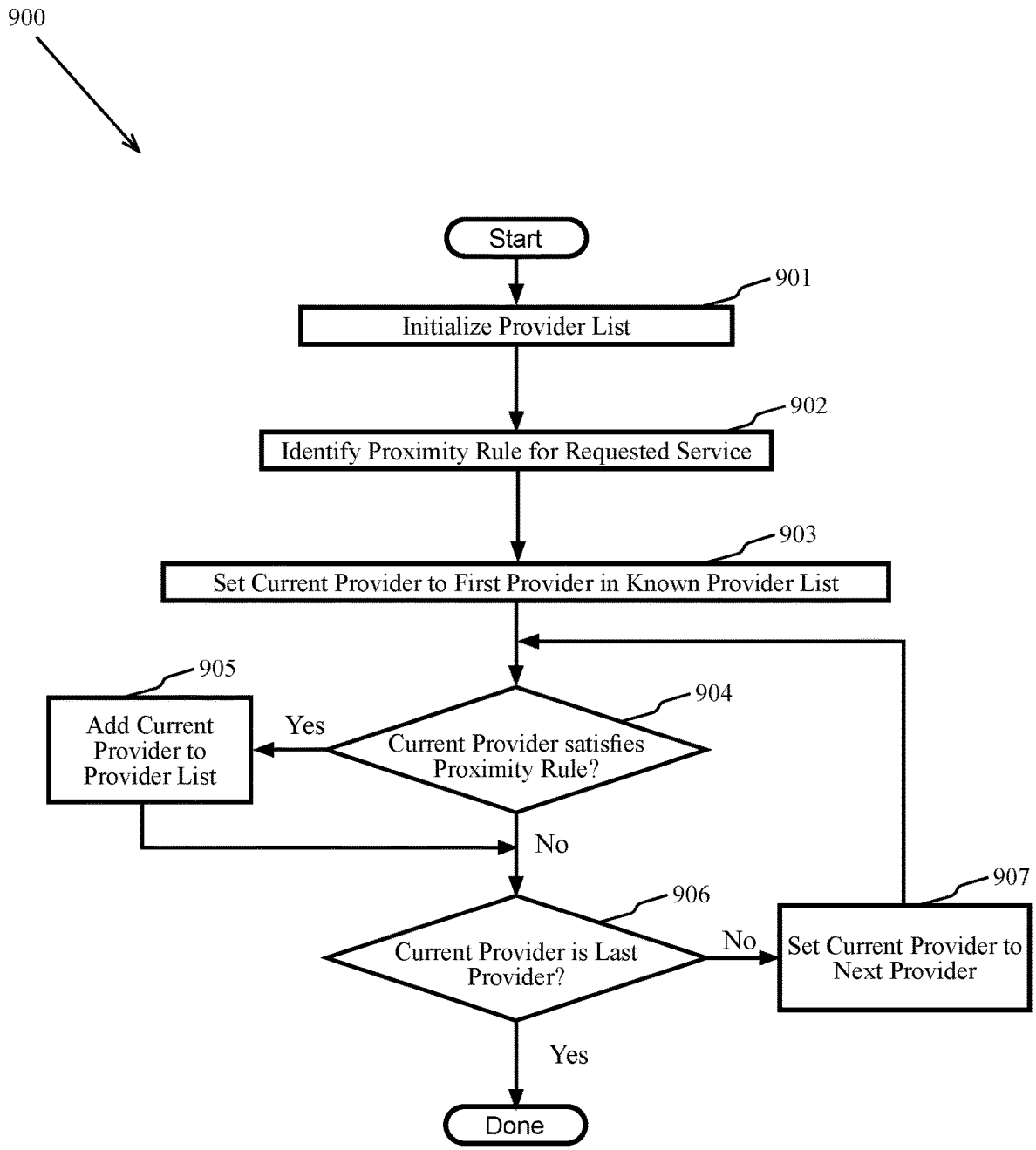
FIG. 9 a high-level flow diagram illustrating an example a process for filtering a known provider list based on a proximity rule, according to some aspects.

FIG. 9 a high-level flow diagram illustrating an example a process for filtering a known provider list based on a proximity rule 900, according to some aspects. After the start, a provider list may be initialized at block 901 (e.g., an empty list instantiated). At block 902, the proximity rule for the requested service is determined. For example, the service type of the requested service may be determined from a service type map 510 and the proximity rule for the service type may be determined from proximity metadata 700. At block 903, current provider may be set to the first provider in a known provider list. The process illustrated in FIG. 8 may have produced the known provider list. The process may move to block 905 if it is determined that the current provider satisfies the proximity rule at decision block 904. Otherwise, the process may move to decision block 906. At block 905 the current provider may be added to the provider list before the process moves to decision block 906. The process may be done if the current provider is the last provider in the known provider list at decision block 906. Otherwise, the process may move to block 907. At block 907, current provider may be set to the next provider in the known provider list before the process loops back to decision block 904.

Figure 10:
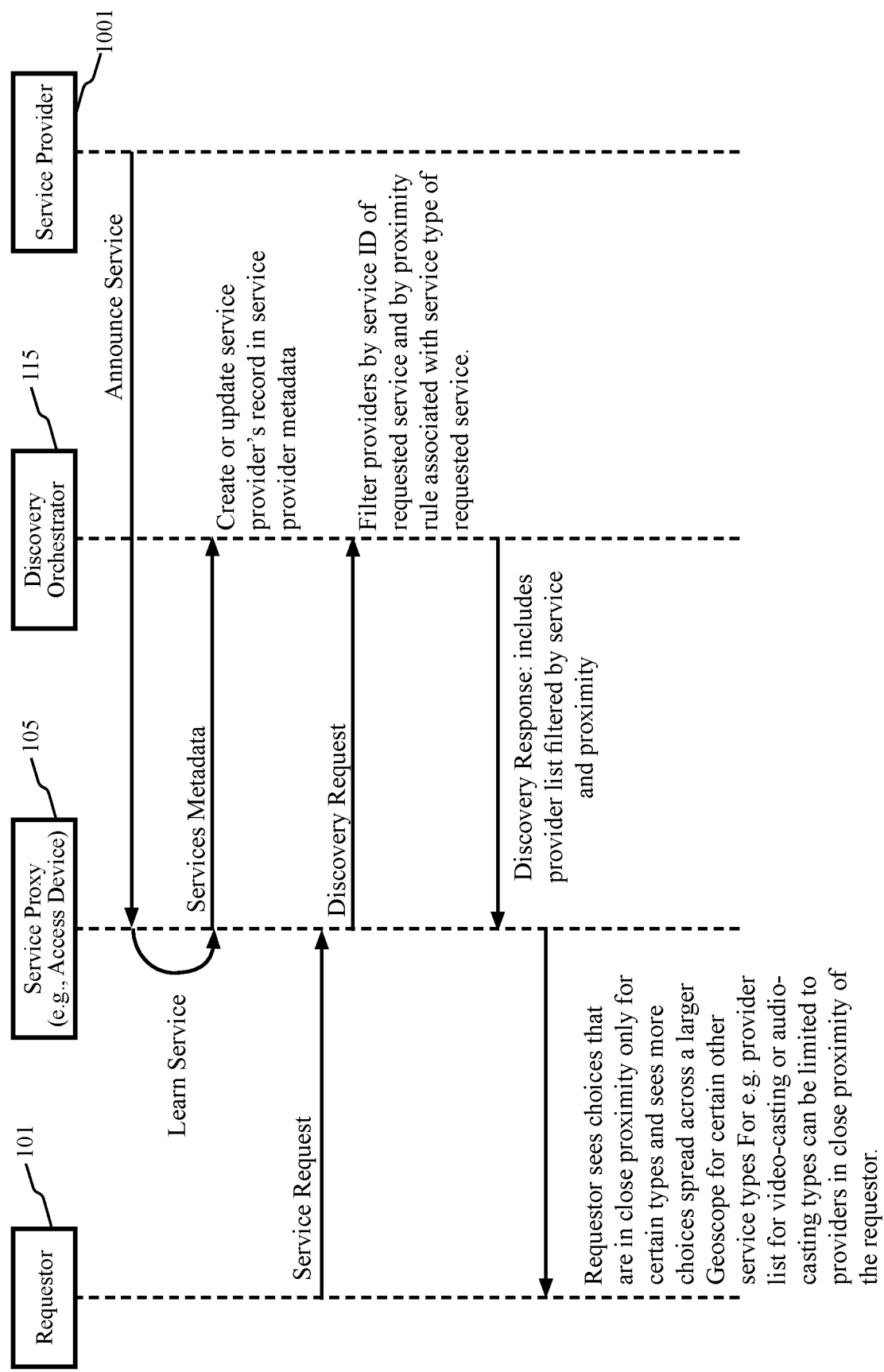
FIG. 10 a high-level ladder diagram illustrating aspects of advertising and discovering services, according to some aspects.

FIG. 10 a high-level ladder diagram illustrating aspects of advertising and discovering services, according to some aspects. In an example, the requester 101 (e.g., a smart phone), the service proxy 105 (e.g., a WIFI access point), and the service provider 1001 (e.g., a printer) are devices located in a customer's facility. In such an example, the discovery orchestrator 115 may be SaaS running on a server located in a data center. A service provider 1001 may transmit a service announcement that indicates that the service provider may provide one or more services. An access device 105, here called a service proxy, may send services metadata to a discovery orchestrator 118 in response to receiving the service announcement. The discovery orchestrator 118 may create or update the service provider's record in service provider metadata 502 in response to receiving the services metadata. At some later time, a requestor 101 may transmit a service request. For example, the service request may be a DNS-SD request sent via mDNS. The service proxy may send a discovery request to the discovery orchestrator 118 in response to receiving the service request. The discovery orchestrator 118 may filter providers by the service ID of the requested service and by the proximity rule associated with service type of requested service to produce a provider list. For example, the discovery orchestrator 118 may implement processes such as those illustrated in FIGS. 8 and 9 to produce the provider list. The discovery orchestrator 118 may send the provider list to the service proxy in a discovery response. The service proxy may send the provider list to the requestor in a service response.

Figure 11:
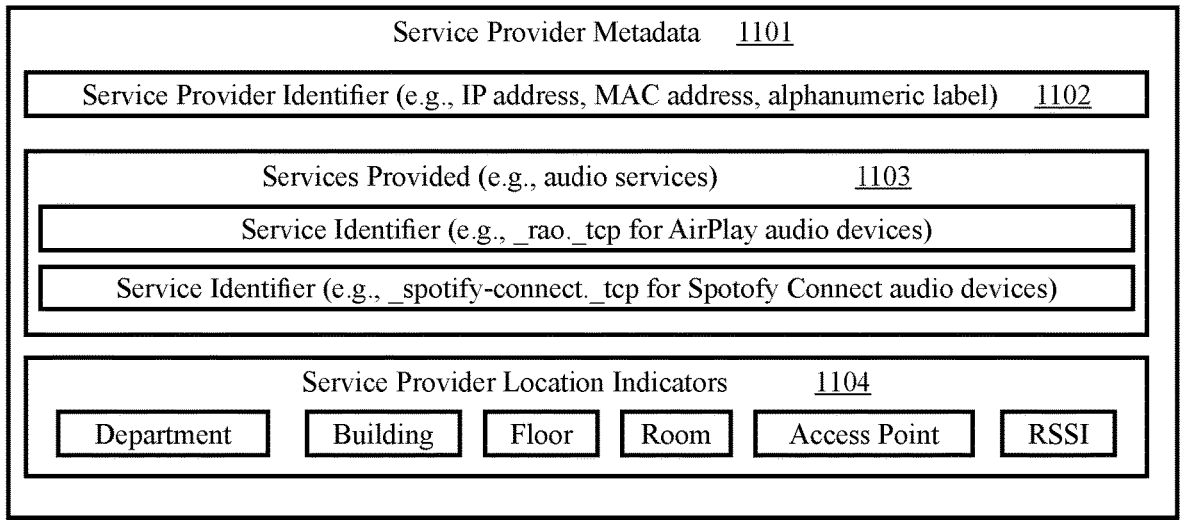
FIG. 11 is a high-level conceptual diagram illustrating an example of service provider metadata, according to some aspects.

FIG. 11 is a high-level conceptual diagram illustrating an example of service provider metadata 1101, according to some aspects. The service provider metadata may include a service provider identifier 1102 that may identify a service provider, a list of the services provided 1103 by the service provider, and service provider location indicators 1104. The service provider identifier 1102 may be the internet protocol (IP) address of the service provider, the media access control (MAC) address of the service provider, or some other value. In the example, the service provider may be an audio device (e.g., network connected speaker) providing audio services such that users may play music from their smartphones on the audio device. The service provider location indicators may indicate the best known location of a service provider. In some examples, the location of the service provider may be known and recorded in the service provider metadata 1101. As such, the service provider location indicators 1104 may include data that indicates a department, a building, a floor, or a room of the service provider. In other examples, the best known location is the location of the access device through which the service provider is connected to the network. As such, the service provider location indicators 1104 may indicate the access device and the strength of the signal (RSSI) through which the service provider is connected to the network. The signal strength may be an indicator of how close the service provider is to the access device.

Figure 12:
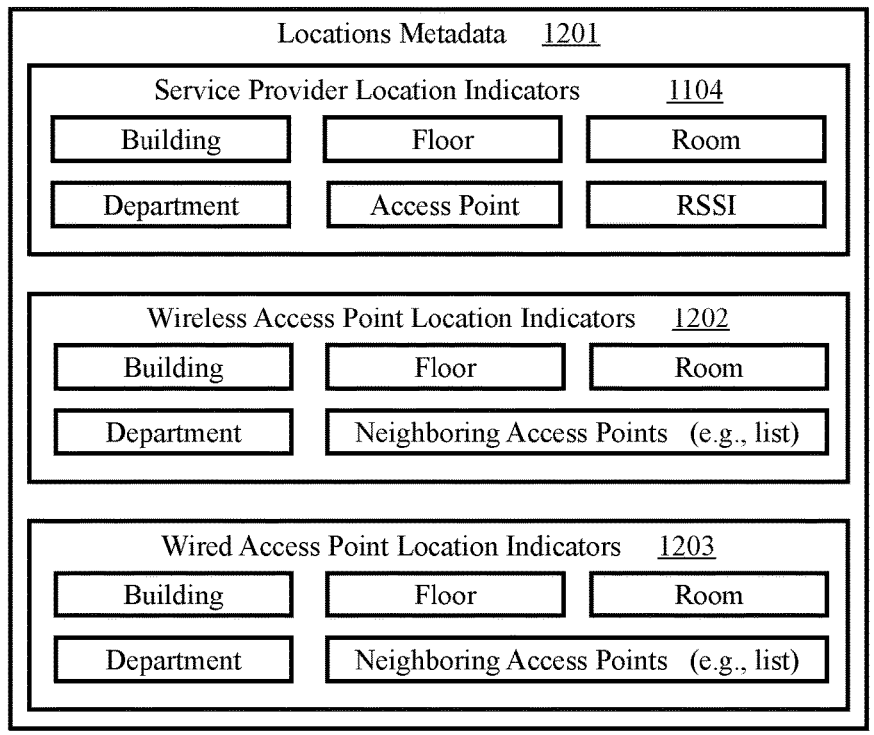
FIG. 12 is a high-level conceptual diagram illustrating an example of locations metadata, according to some aspects.

FIG. 12 is a high-level conceptual diagram illustrating locations metadata 1201, according to some aspects. The locations metadata 1201 may be or include service provider location indicators 1104, wireless access point location indicators 1202, and wired access point location indicators 1203. Wireless access points and wired access points are examples of access devices. The service provider location indicators 1104 that may indicate the locations of the service providers, as discussed above. The wireless access point location indicators 1202 may include data that indicates a department, a building, a floor, a room, and a list of neighboring access devices. The wired access point location indicators 1203 may include data that indicates a department, a building, a floor, a room, and a list of neighboring access devices. The neighboring access devices may be a list of access devices that are "one hop" away. As is well known in the art, a "hop" may be a layer 2 transmission and reception of a network packet. As such, networking devices that are one hop away from one another may be connected at layer 2. As is also well known in the art of computer networks, layer 2 (often called the datalink layer) may be one of the layers in a protocol stack and may be the protocol layer that transfers data between nodes across the physical layer. A list of the neighboring access devices may be used by proximity rules that require two devices to be within a maximum hop count such as within two hops of one another, within three hops of one another, etc. Devices that are within one hop of one another may be connected to the same access device.

Figure 13:
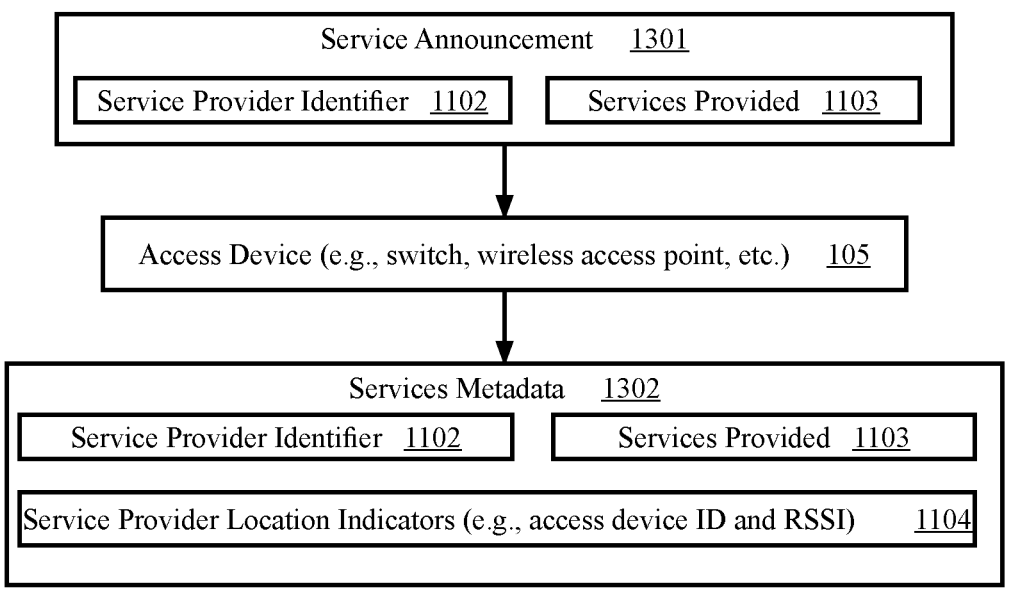
FIG. 13 is a high-level conceptual diagram illustrating an example of an access device processing a service announcement, according to some aspects.

FIG. 13 is a high-level conceptual diagram illustrating an example of an access device 105 processing a service announcement 1301, according to some aspects. FIG. 13 illustrates an example in which the location of the service provider is inferred from the location of the access device through which the service provider is connected to the network. For example, the service provider may be a wireless device that is often moved from room to room and floor to floor. The service announcement 1301 may include a service provider identifier 1102 and a list of services provided 1103. The access device 105 may produce services metadata 1302 in response to receiving the service announcement 1301. The services metadata 1302 may include the service provider identifier 1102, the list of services provided 1103, and service provider location indicators 1104. The service provider location indicators 1104 may include an access device identifier that uniquely identifies the access device 105 and may include the strength of the signal (RSSI) through which the service provider communicates with the access device 105. The physical location of the access device 105 may be found in the locations metadata 1201. For example, the access device identifier may be used as an index into a database that stores the locations metadata 1201. The location of the access device may be used as the location of the service provider, thereby inferring the service provider location from the access device location.

Figure 14:
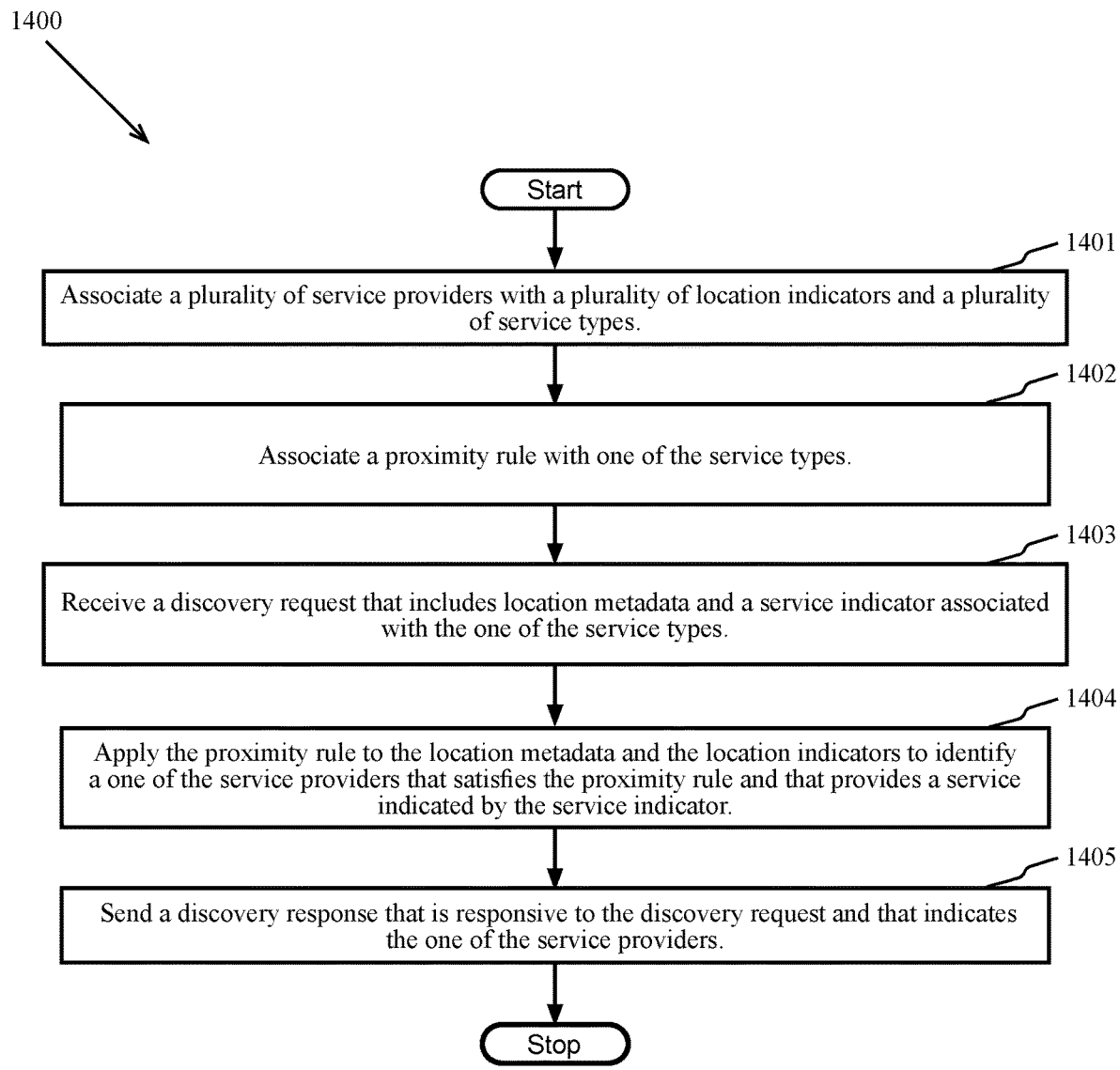
FIG. 14 is a high-level flow diagram illustrating an example of a method for providing a filtered discovery service, according to some aspects.

FIG. 14 is a high-level flow diagram of a method for providing a filtered discovery service 1400, according to some aspects. At block 1401, a plurality of service providers may be associated with a plurality of location indicators and a plurality of service types. At block 1402, a proximity rule may be associated with one of the service types. At block 1403, a discovery request may be received. The discovery request may include location metadata and a service identifier associated with the one of the service types. At block 1404, the proximity rule may be applied to the location metadata and the location indicators to identify a one of the service providers that satisfies the proximity rule and that provides a service indicated by the service identifier. At block 1405, a discovery response may be sent, the discovery response may be responsive to the discovery request and may indicate the one of the service providers.

Although the operations of the methods and processes may be shown and described in a particular order, the order of the operations may be altered so that certain operations may be performed in an inverse order or so that certain operations may be performed, at least in part, concurrently with other operations. Alternatively, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described examples may also be implemented by operating a computer system to execute a sequence of machine-readable instructions. The computer readable instructions, when executed on one or more processors, may implement a method or process. The instructions may reside in various types of computer readable media. An example of a programmed product may include a computer readable medium tangibly storing a program of machine-readable instructions executable by a digital data processor to perform a method or process. The computer readable media may comprise memory (e.g., RAM) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a hard drive, a solid state drive, a RAID array, magnetic tape, electronic read-only memory, an optical storage device (e.g., CD ROM, WORM, DVD, digital optical tape), paper "punch" cards. In an illustrative example, the machine-readable instructions may comprise lines of compiled C, C++, or similar language code commonly used by those skilled in the programming.

The foregoing description of examples will so fully reveal the general nature of the various aspects that others can, by applying current knowledge, readily modify and/or adapt for various applications the examples without departing from the generic concept, and, therefore, such adaptations and modifications should and are intended to be comprehended within the meaning and range of equivalents of the disclosed examples. It is to be understood that the phraseology or terminology employed herein is for the purpose of description and not of limitation. Therefore, those skilled in the art will recognize that the examples herein can be practiced with modification within the spirit and scope of the claims as described herein.

What is claimed is:

1. A method comprising:
associating a plurality of service providers with a plurality of location indicators and a plurality of service types;
associating a proximity rule with one of the service types;
receiving a discovery request that includes location metadata and a service identifier associated with the one of the service types;
applying the proximity rule to the location metadata and the location indicators to identify a one of the service providers that satisfies the proximity rule and that provides a service indicated by the service identifier; and
sending a discovery response that is responsive to the discovery request and that indicates the one of the service providers.

2. The method of claim 1, further including associating a plurality of service identifiers with the one of the service types.

3. The method of claim 1, wherein the one of the service types is associated with a plurality of audio services.

4. The method of claim 1, wherein the one of the service types is associated with a plurality of media sharing services.

5. The method of claim 1, wherein the one of the service types is associated with a plurality of screen casting services.

6. The method of claim 1, wherein the one of the service types is associated with a plurality of printing services.

7. The method of claim 1, further including:
associating the one of the service providers with a location indicator for the one of the service providers in response to receiving service metadata from an access device,
wherein the service metadata includes the service identifier, a service provider identifier of the one of the service providers, and the location indicator for the one of the service providers.

8. The method of claim 7, further including:
sending the service metadata to a discovery orchestrator in response to receiving a service announcement from the one of the service providers.

9. The method of claim 7 wherein a wireless access point sends the service metadata to a discovery orchestrator in response to receiving a service announcement from the one of the service providers.

10. The method of claim 1, wherein the proximity rule requires a maximum hop count between the location metadata and a location indicator associated with the one of the service providers.

11. The method of claim 1, wherein the proximity rule requires the location metadata to indicate a room indicated by a location indicator associated with the one of the service providers.

12. A system comprising:
a memory configured to store a services metadata and a proximity metadata, the services metadata associating a plurality of location indicators with a plurality of service providers and a plurality of service types, and the proximity metadata associating a proximity rule with one of the service types; and
a processor coupled to the memory, wherein the processor and the memory are configured to provide a filtered discovery service, wherein providing the filtered discovery service includes:
receiving a discovery request that includes location metadata and a service identifier associated with the one of the service types;
applying the proximity rule to the location metadata and to the location indicators to identify a one of the service providers that satisfies the proximity rule and that provides a service indicated by the service identifier; and
sending a discovery response that is responsive to the discovery request and that indicates the one of the service providers.

13. The system of claim 12, wherein providing the filtered discovery service includes associating a service provider with a location indicator in response to receiving service metadata from an access device.

14. The system of claim 13, further including a wireless access point configured to send the service metadata to a discovery orchestrator in response to receiving a service announcement from the service provider.

15. The system of claim 12, wherein providing the filtered discovery service includes associating a plurality of service identifiers with the one of the service types.

16. The system of claim 12, wherein the proximity rule requires a maximum hop count between the location metadata and a location indicator associated with the service provider.

17. The system of claim 12, wherein the proximity rule requires the location metadata to indicate a room indicated by a location indicator associated with the service provider.

18. The system of claim 12, wherein the one of the service types is associated with a plurality of screen casting services.

19. A system comprising:
an association means for associating a plurality of service providers with a plurality of location indicators and a plurality of service types;
a rule association means for associating a proximity rule with one of the service types;
a receiver means for receiving a discovery request that includes location metadata and a service identifier associated with the one of the service types;
an identification means for applying the proximity rule to the location metadata and the location indicators to identify one of the service providers that satisfies the proximity rule and that provides a service indicated by the service identifier; and
a transmission means for sending a discovery response that is responsive to the discovery request and that indicates the one of the service providers.

20. The system of claim 19, further including:

a means for associating the one of the service providers with a location indicator for the one of the service providers in response to receiving service metadata from an access device, wherein the service metadata includes the service identifier, a service provider identifier of the one of the service providers, and the location indicator for the one of the service providers.

* * * * *